United States Patent
Sanchez Mugica et al.

(10) Patent No.: US 10,266,344 B2
(45) Date of Patent: Apr. 23, 2019

(54) SEPARATING SYSTEM, AND ASSOCIATED PACKAGING INSTALLATION

(71) Applicant: Ulma Packaging Technological Center, S. Coop., Oñati (ES)

(72) Inventors: Ion Sanchez Mugica, Oñati (ES); Pedro Jose Caballero Pozo, Oñati (ES)

(73) Assignee: ULMA PACKAGING TECHNOLOGICAL CENTER, S. COOP, Oñati (ES)

( * ) Notice: Subject to any disclaimer, the term of this patent is extended or adjusted under 35 U.S.C. 154(b) by 0 days.

(21) Appl. No.: 15/723,798

(22) Filed: Oct. 3, 2017

(65) Prior Publication Data

US 2018/0093831 A1  Apr. 5, 2018

(30) Foreign Application Priority Data

Oct. 4, 2016 (EP) ..................................... 16382456

(51) Int. Cl.
*B65G 47/34* (2006.01)
*B65G 47/38* (2006.01)
(Continued)

(52) U.S. Cl.
CPC .............. *B65G 15/22* (2013.01); *B65B 25/04* (2013.01); *B65B 35/10* (2013.01); *B65G 47/38* (2013.01); *B65G 23/28* (2013.01); *B65G 2201/0211* (2013.01); *B65G 2812/02148* (2013.01); *B65G 2812/02217* (2013.01)

(58) Field of Classification Search
None
See application file for complete search history.

(56) References Cited

U.S. PATENT DOCUMENTS 3,618,289 A  11/1971 Wach et al.
5,072,100 A * 12/1991 McClusky ............ B65B 25/046
                                                235/98 A
(Continued)

FOREIGN PATENT DOCUMENTS

EP    2524875 A1   11/2012
WO  2005037686 A2   4/2005

OTHER PUBLICATIONS

European Search Report in corresponding European Patent Application No. 1638245.8, dated Apr. 25, 2017.

*Primary Examiner* — Kavel Singh
(74) *Attorney, Agent, or Firm* — Edell, Shapiro & Finnan, LLC

(57) ABSTRACT

Separating system for separating a support and a product arranged on the support. According to one embodiment the system includes conveying means adapted for receiving the product arranged on its support and for conveying the products in a first conveyance direction. The conveying means includes two product support elements separated from one another in at least one point by a width less than a width of the product (the width of the product being transverse to the first conveyance direction) and greater than the width of its support (with the width of the support being transverse to the first conveyance direction), such that the product is supported by, and conveyed on, the product support elements of the conveying means, and the support is separated from the product upon the product being supported on the product support elements.

24 Claims, 7 Drawing Sheets

(51) Int. Cl.
    *B65G 15/22*     (2006.01)
    *B65B 35/10*     (2006.01)
    *B65B 25/04*     (2006.01)
    *B65G 23/28*     (2006.01)

(56) References Cited

U.S. PATENT DOCUMENTS

| | | |
|---|---|---|
| 5,421,446 A | 6/1995 | Koch et al. |
| 6,776,279 B2 * | 8/2004 | Krull ................. B65G 47/24 |
| | | 198/626.1 |
| 2002/0092734 A1 * | 7/2002 | Troupos ............... B65G 47/54 |
| | | 198/809 |
| 2016/0207212 A1 * | 7/2016 | Rogers ............... B26D 1/0006 |

* cited by examiner

SEPARATING SYSTEM, AND ASSOCIATED PACKAGING INSTALLATION

CROSS-REFERENCE TO RELATED APPLICATIONS

This application relates to and claims the benefit and priority to European Application No. EP16382456.8, filed Oct. 4, 2016, which is incorporated herein by reference in its entirety.

TECHNICAL FIELD

The present invention relates to separating systems for separating a support and a product arranged on the support, and to packaging machines comprising at least one of the separating systems.

BACKGROUND

In most packaging machines, the products being packaged are conveyed thereto at the same time they are packaged. Some types of products, mainly due to their shape, show certain instability which prevents them from holding their position during conveyance, packaging not being performed correctly. As a result, machines in which different solutions are used for holding the products in position during conveyance and packaging for correct packaging thereof are known.

One solution involves using two facing supports (V-shaped, for example) between which the products are arranged, conveyed and packaged. Conveying means that allow movement of products are arranged below same, and as a result of the supports, the products are held in their transverse position. To prevent them from moving longitudinally, one element preventing the relative longitudinal movement thereof during conveyance is additionally used for each product, thereby being held in position during conveyance and packaging.

In other solutions, due to their shape the products are conveyed on supports to hold them in position, the supports being what hold the products in the position. The products must subsequently be separated from the supports, such that the products reach the desired site by themselves.

This occurs, for example, in packaging machines for packaging products with an unstable shape, such as cabbages or lettuces, where the products are arranged on conveying means for being packaged and subsequently discharged from the machine. For example, the products can be conveyed by means of a conveyor belt during the packaging process in a forward movement direction, and at the end of the belt's path, the packaged products are arranged, for example, in a shrink-wrap tunnel to reduce and adapt the contour of the package to the shape of the product.

Due to the shape of the products, the products can roll or move during packaging and conveyance, so it is necessary to hold them in position during the conveyance for packaging. In the machines disclosed in U.S. Pat. No. 3,618,289A and WO2005037686A2, for example, supports or elements holding the products in position while they are conveyed and packaged are used, it being unnecessary to use any separating system because the supports themselves are part of the conveying means.

In packaging machines for packaging products with an unstable shape, separating systems are known for separating the product (once packaged) from its support, such as the shown in FIG. 1, for example. Each product P' is arranged on an annular-shaped support 3' for packaging and conveyance and is conveyed in this manner by conveying means 1' during packaging. At the end of the conveying means 1' the products P' are already packaged and the system comprises conveying means 2' arranged after the first means to separate a product P' and its support 3'. The system comprises a stop 4' at the end of the conveying means 2', which handles separating the supports 3' from the products P'. Therefore only the products P' and not the supports 3', which can be recirculated to be used again, for example, go to the desired position (at the entrance into a shrink-wrap tunnel, onto a conveyor belt, into a container or into a case, for example). The stop 4' is fixed and arranged such that the supports 3' hit it when they reach their position whereas the products P' exit above it, such that products P' and supports 3' are separated in the point. In this case, the supports 3' hit the stops 4', and with the aid of an ejector 5', are moved in a transverse direction T' with respect to the forward movement direction A'. The ejector 5' ejects the supports 3' in the transverse direction T' and thereby causes them to be ejected from the machine, or it can redirect them to the beginning of the machine to be reused with a new product P' to be packaged. However, sometimes the product P' does not exit above the stop 4' (due to a low conveyance speed, the shape or weight of the product P', or a poor arrangement of the product P' itself on the support 3'), causing the product P' to remain on the conveying means 2' and generating a jam on the means that requires stopping the packaging machine.

EP2524875A1 discloses a separating system for separating a support and a product arranged on the support, the support comprising a cavity in contact with the product. The system comprises a first output conveyor belt for the products and a second output conveyor belt for the supports on a lower level than the first conveyor belt, a bar at the entrance of the first conveyor belt, and a movable conveyor belt configured for adopting two positions: a first position in which the movable conveyor belt is arranged at the entrance of the second output conveyor belt and the bar is introduced into the cavity of the support and allows the conveyance of the support towards the second output conveyor belt, while at the same time the product remains on the bar; and a second position in which the movable conveyor belt is arranged at the entrance of the first output conveyor belt in contact with the product, the movable conveyor belt conveying the product towards the first output conveyor belt.

SUMMARY OF THE DISCLOSURE

The separating system of the invention comprises conveying means adapted for receiving the product arranged on its support and for transporting it in a given conveyance direction, and it is configured for separating the product from the support, and it is particularly adapted for separating a product comprising a width greater than the width of the support on which it is arranged.

The conveying means comprises two support elements separated from one another in at least one point by a width less than a width of the product, the width of the product being transverse to the conveyance direction of the product. The product also has a width that is equal to or greater than the width of its support, the width of the product being transverse to the conveyance direction of the product. The product is therefore supported by, and conveyed on, the support elements of the conveying means at which time it is separated from the support.

It is therefore the actual configuration of the conveying means of the separating system that causes the separation of the product from its support, and no additional elements are required. A simpler and more straightforward separating system thus being obtained. Furthermore, since it is the actual configuration of the conveying means which performs the separation, no specific detection and control means for detecting the products and activating the means for performing the separation, for example, are required, simplifying the system and eliminating or at least greatly reducing the risk of the products and/or supports generating jams.

These and other advantages and features will become evident in view of the drawings and the detailed description.

DETAILED DESCRIPTION

Figure 1:
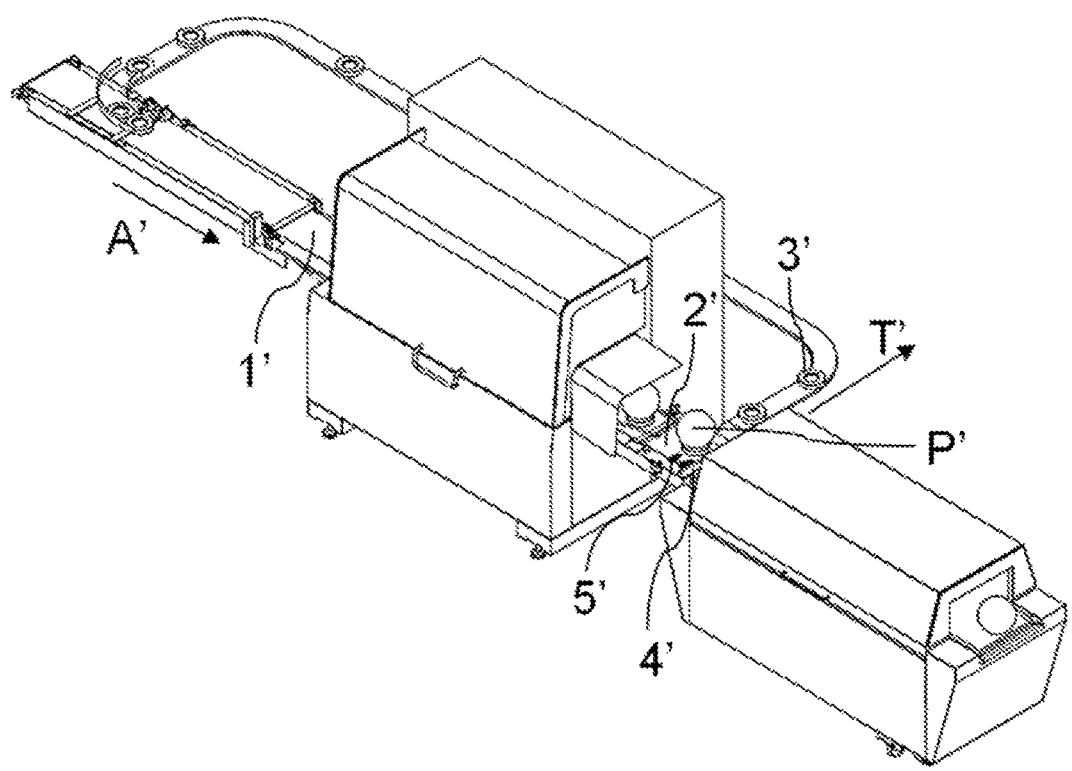
FIG. 1 shows a separating system of the prior art comprised in a horizontal packaging machine.
Figure 2:
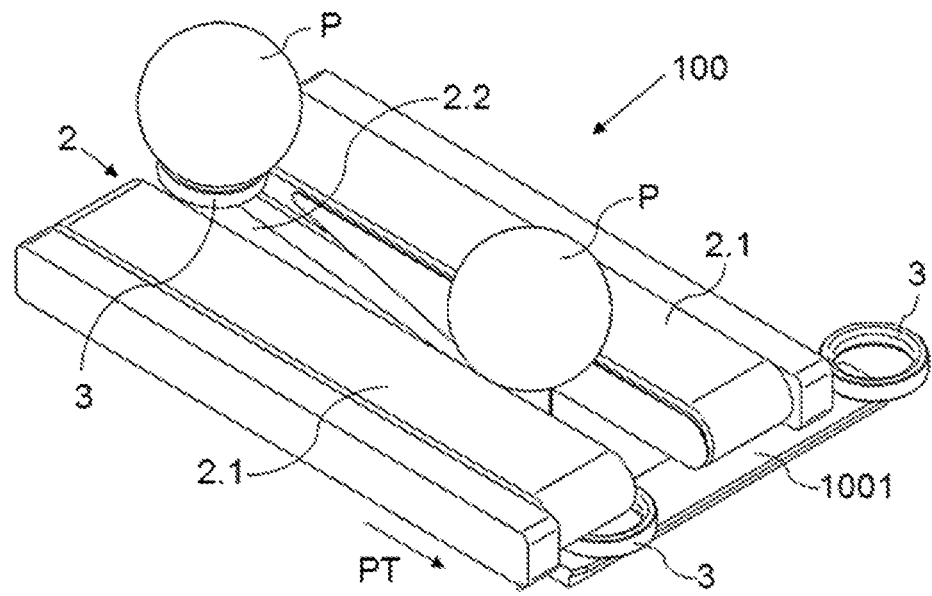
FIG. 2 shows a perspective view of an embodiment of a separating system according to one embodiment.
Figure 3:
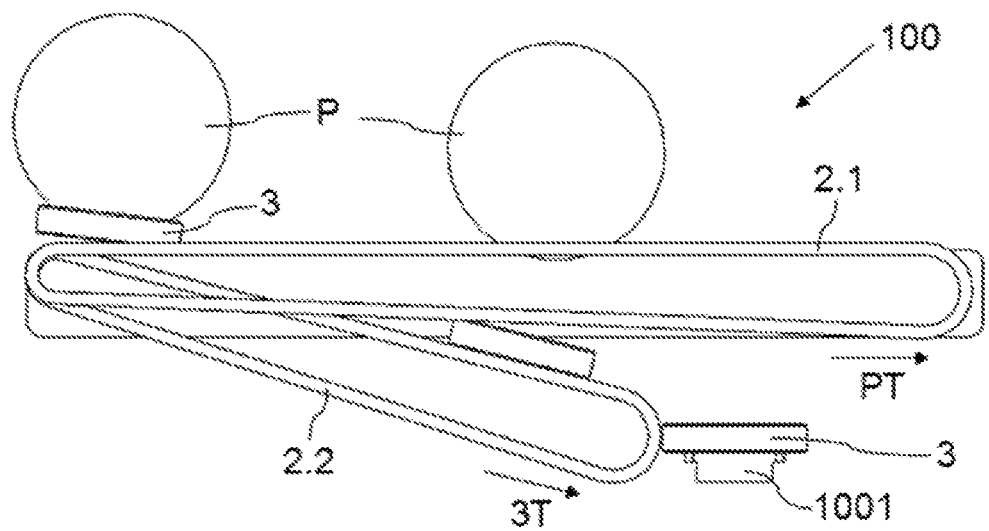
FIG. 3 shows a side view of the separating system according to the embodiment of FIG. 2.

A first aspect relates to a separating system 100 for separating a support 3 from a product P arranged on the support 3, such as the one shown by way of example and in a simplified manner in FIGS. 2 and 3, so that the product P can be conveyed to where it is required without a support 3. The system 100 comprises conveying means 2 adapted for receiving the product P arranged on its support 3 and for conveying it in a given conveyance direction PT, and the system 100 is configured particularly for separating the product P comprising a width transverse to the conveyance direction PT greater than the width of the support. The width of the support being transverse to the conveyance direction PT. The system 100 is adapted for being arranged after a packaging machine 1000, such as that shown by way of example in FIG. 4, and the product P is a product P that has been packaged in the packaging machine 1000. According to one embodiment the support 3 comprises an annular shape.

The system 100 is particularly advantageous for products with an unstable shape, such as cabbages or lettuces, for example, where the products have to be arranged on supports to hold them in position during conveyance and packaging in a packaging machine 1000, and where the premise that the products have a width greater than the width of the supports on which they are arranged (with respect to their conveyance direction) holds true. However, this separating system is adapted for separating a product from its support, provided that the width of the product is greater than the width of the corresponding support.

According to one embodiment, the conveying means 2 comprise two support elements 2.1 separated from one another in at least one point by a width with respect to the conveyance direction PT less than the width of the product P with respect to the conveyance direction PT and greater than the width of its support 3 with respect to the conveyance direction PT. So when the product P arranged on its support 3 reaches the point of the conveying means 2, the support 3 is not supported by the support elements 2.1 of the conveying means 2 due to the separation existing between them, whereas the product P is supported by, and conveyed on, the support elements 2.1, the product P thereby being separated from its support 3. Therefore the actual configuration of the conveying means 2 causes the separation between the product P and its support 3, without requiring additional elements or specific controls, for example. According to one embodiment the product P with its support 3 is made to reach the system 100 such that the support 3 is aligned with the separation existing between the two support elements 2.1.

According to one embodiment the two support elements 2.1 are separated from one another by a width with respect to the conveyance direction PT less than the width of the product P with respect to the conveyance direction PT and greater than the width of its support 3 with respect to the conveyance direction PT, in at least one section. Although not required, in the exemplary embodiment shown in the drawings the separation between both support elements 2.1 is maintained along the entire length of the support elements 2.1 and both support elements 2.1 are identical and parallel.

The system 100 can further comprise adjustment means associated with the conveying means 2, adapted for regulating the separation between the support elements 2.1 of the conveying means 2 by means of the transverse movement with respect to the conveyance direction PT of at least one of the support elements 2.1 with respect to the other. This allows modifying the width of the separation between the support elements 2.1 of the conveying means 2, as depicted in FIGS. 5 to 8, for example, where zero separation (FIG. 5) and maximum separation (FIGS. 6 to 8) are shown, at least in the point where the separation comprises a width less than the width of the product P with respect to the conveyance direction PT and greater than the width of its support 3 with respect to the conveyance direction PT, which allows adapting the conveying means 2 for products P and supports 3 of different sizes, for example, as needed.

In the embodiment of the system 100 shown in the drawings, the adjustment means comprises an actuator configured for moving both support elements 2.1 simultaneously and in opposite directions. The actuator comprises a drive shaft 4.1 with a first threaded section associated with one of the support elements 2.1 of the conveying means 2, and a second threaded section associated with the other support element 2.1 of the conveying means 2, the first threaded section comprising a thread in one direction and the second threaded section comprising a thread in the opposite direction, such that when the drive shaft 4.1 is caused to rotate, the threads in opposite directions of the two threaded sections of the drive shaft 4.1 cause both support elements 2.1 of the conveying means 2 to move simultaneously and opposite to one other. The actuator further comprises a first transmission element 4.2 with a hole having a thread complementary to the threading of the first threaded section of the drive shaft 4.1 and the first threaded section going through same, the rotation of the drive shaft 4.1 thereby causing the movement of the first transmission element 4.2. The first transmission element 4.2 is attached to one of the support elements 2.1, the movement of the first transmission element 4.2 thereby causing the movement of the support element 2.1 of the conveying means 2. The actuator further comprises a second transmission element 4.3 with a hole having a thread complementary to the threading of the second threaded section of the drive shaft 4.1 and the second threaded section going through same, thereby causing rotation of the drive shaft 4.1, as well as the movement of the second transmission element 4.3 (in the direction opposite the movement of the first transmission element 4.2). The second transmission element 4.3 is attached to the other support element 2.1, the movement of the second transmission element 4.3 thereby causing the movement of the support element 2.1 of the conveying means 2. The actuator further comprises at least one guide 4.5 associated with the first and second transmission 4.2 and 4.3 for guiding the movement of both the first and second transmission elements 4.2 and 4.3. In the embodiment of the drawings, the system 100 comprises two parallel rod-like guides 4.5.

In the embodiment of the system 100 shown in the drawings, the rotation of the drive shaft 4.1 is caused manually, and for that purpose the actuator comprises a lever 4.4 fixed to one end of the drive shaft 4.1, which can rotate in both directions. According to other embodiments the rotation of the drive shaft 4.1 may be driven by a motor.

The separation between both support elements 2.1 can be a gap through which the support 3 falls directly, but in the embodiment shown in the drawings, the conveying means 2 comprises an additional support element 2.2 for supporting the support 3 when it is separated from the product P and on which the support 3 is conveyed to a desired location. The length of the additional support element 2.2 can be the same as or different from that of the support elements 2.1. The width of the additional support element 2.2 furthermore does not have to coincide with the width of the separation between the two support elements 2.1, but in any case the additional support element 2.2 will be configured to support and convey the support 3.

In the embodiment of the system 100 shown in the drawings, the support elements 2.1 are arranged such that the product P supported by them is conveyed on them in the conveyance direction PT. In turn, the additional support element 2.2 is arranged such that the support 3 supported by it is conveyed on it in a second conveyance direction 3T, preferably different from the conveyance direction PT. The support 3 is therefore separated from its product P and heads towards a predetermined destination, and can be recirculated, for example, to be used again by conveying means 1001 arranged for such purpose, and the product P heads towards a predetermined destination different from that of the support 3, such as a shrink-wrap tunnel 2000, a conveyor belt for conveying it someplace else, a case or any other required destination, for example. Although not required, in the embodiment of the drawings, the additional support element 2.2 extends with a given angle of inclination downwards with respect to the support elements 2.1, and the support elements 2.1 are identical and parallel to one another.

In any embodiment of the system 100 in which the conveying means 2 comprises an additional support element 2.2, the system 100 can comprise actuation means for causing the additional support element 2.2 to pivot with respect to one of its ends, for example, with respect to the end receiving the support 3. Regulation of the separation between the support elements 2.1 of the conveying means can therefore be aided or enabled in those embodiments of the system 100 comprising adjustment means for performing the regulation.

Figure 6:
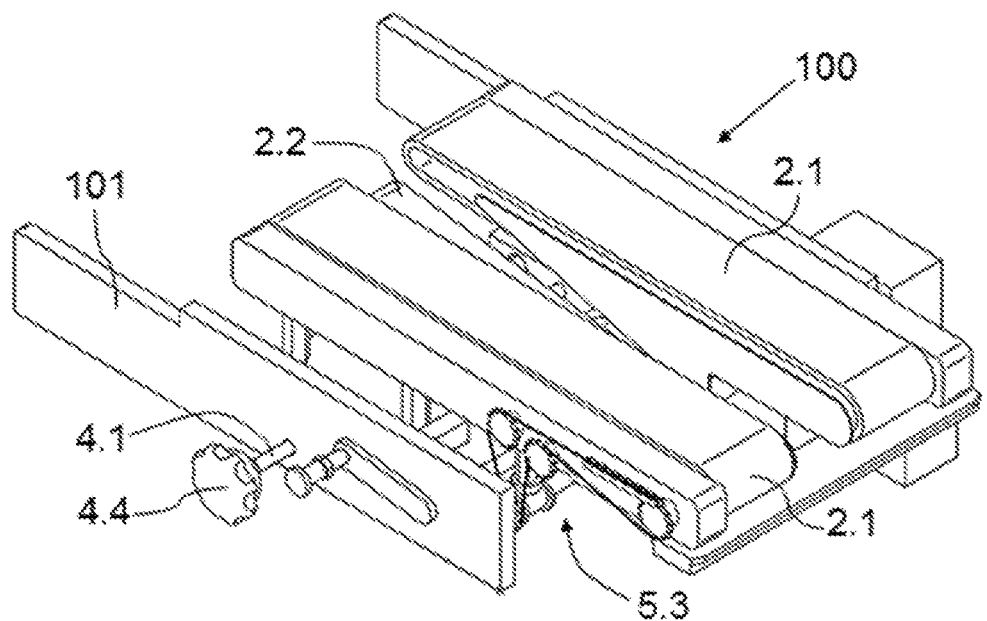
FIG. 6 shows a perspective view of a separating system according to the embodiment of FIG. 2, with a maximum separation between the two support elements of the conveying means of the system and with the additional support element in a first position.
Figure 7:
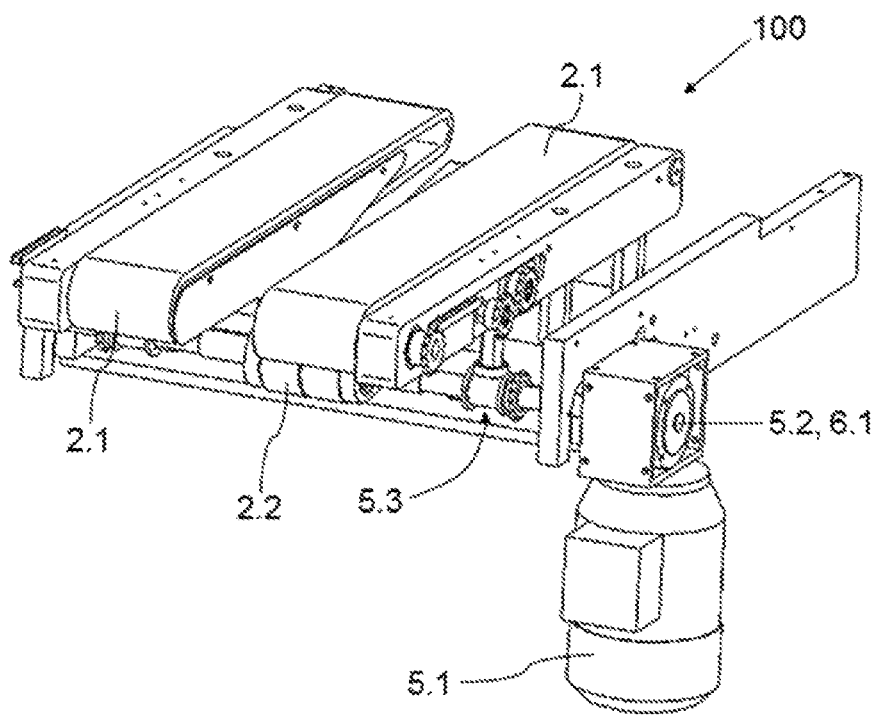
FIG. 7 shows another perspective view of a separating system according to the embodiment of FIG. 2, with a maximum separation between the two support elements of the conveying means of the system and with the additional support element in a first position.
Figure 8:
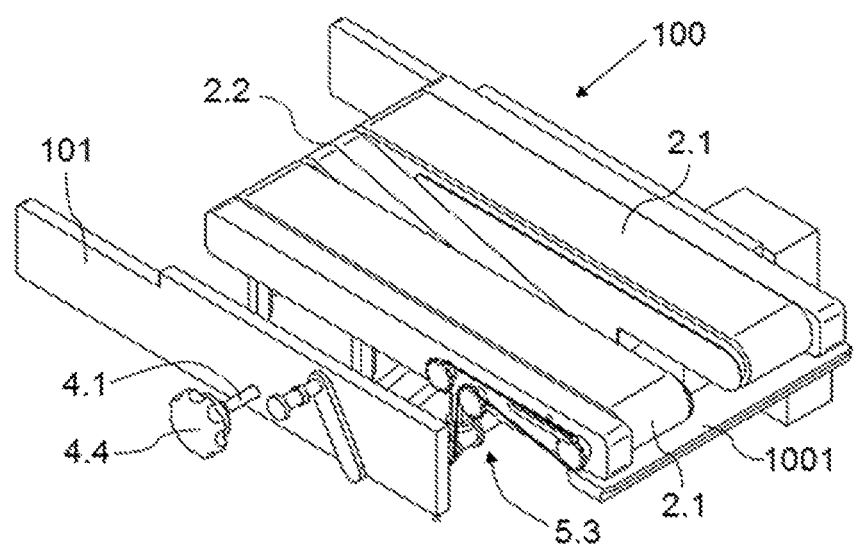
FIG. 8 shows a simplified perspective view of a separating system according to the embodiment of FIG. 2, with a maximum separation between the two support elements of the conveying means of the system and with the additional support element in a second position.
Figure 9:
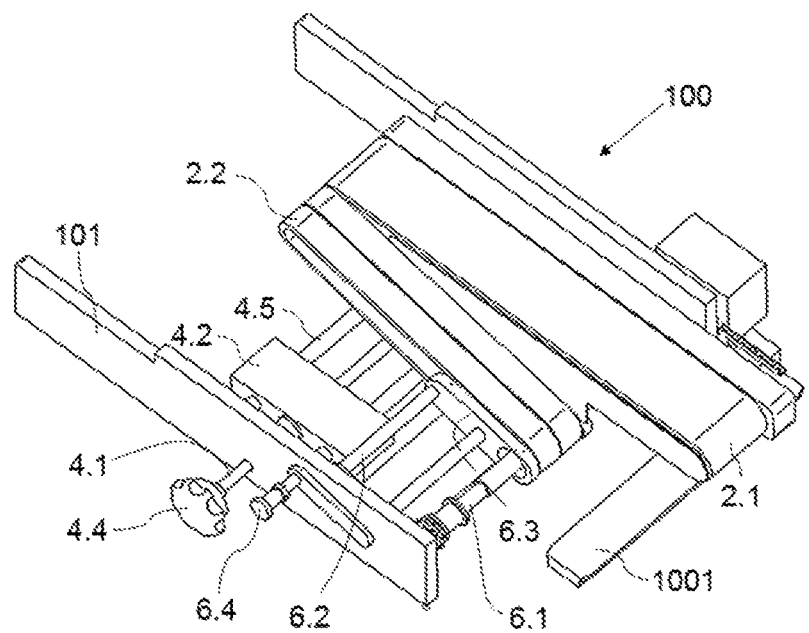
FIG. 9 corresponds with FIG. 8 but without one of the support elements of the conveying means of the system, to show the actuator of the system that is used for causing the change in position of the additional support element.
Figure 10:
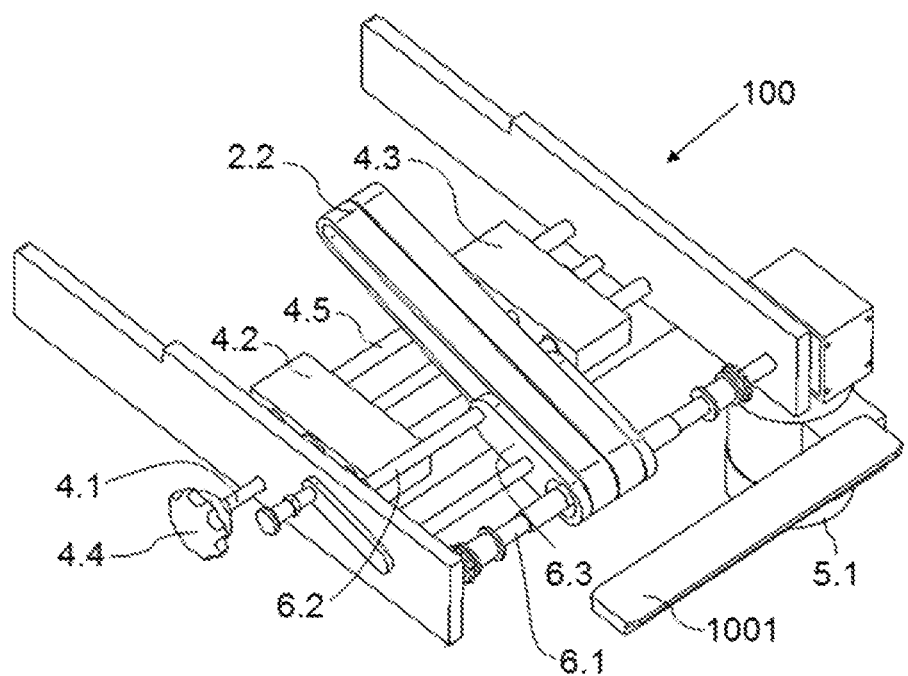
FIG. 10 corresponds with FIG. 8 but without the support elements of the conveying means of the system.

Therefore, the additional support element 2.2 of the conveying means 2 is adapted for adopting a first position in which it frees up the space existing between the two support elements 2.1 (positioned below the support elements 2.2 shown by way of example in FIG. 6), allowing the support elements 2.1 to get closer to one another, for example, when the separation existing between them is regulated, and a second position in which the additional support element 2.2 is partially arranged in the space located between both support elements 2.1 (position shown by way of example in FIG. 8), for gently receiving the support 3. The system 100 comprises an actuator for causing the additional support element 2.2 of the conveying means 2 to switch between the first position and the second position (and vice versa), the actuator comprising a first pivoting element 6.1 associated with a fixed structure 101 (or frame 101) of the system 100 and associated with the additional support element 2.2, an actuation element 6.2 associated with the additional support element 2.2 and spaced from the first pivoting element 6.1 in the second conveyance direction 3T, and an attachment element 6.3 attaching the pivoting element 6.1 and the actuation element 6.2 to one another, as shown in FIGS. 9 and 10. For the additional support element 2.2 to transition from a first position to the second position, or vice versa, the actuation element 6.2 is caused to rotate with respect to the pivoting element 6.1. The frame 101 of the system 100 comprises the elements required for fixing the actuation element 6.2 in position (for example an actuator 6.4 attached to the actuation element 6.2 and configured for being fixed to the frame 101), such that the additional support element 2.2 is kept in the desired position. Although reference has been made only to a first and a second position, the system 100 can be configured so that the additional support element 2.2 can also be arranged in any other intermediate position between the first and the second position by configuring different points for anchoring the actuation element 6.2 to the structure 101, for example.

Figure 5:
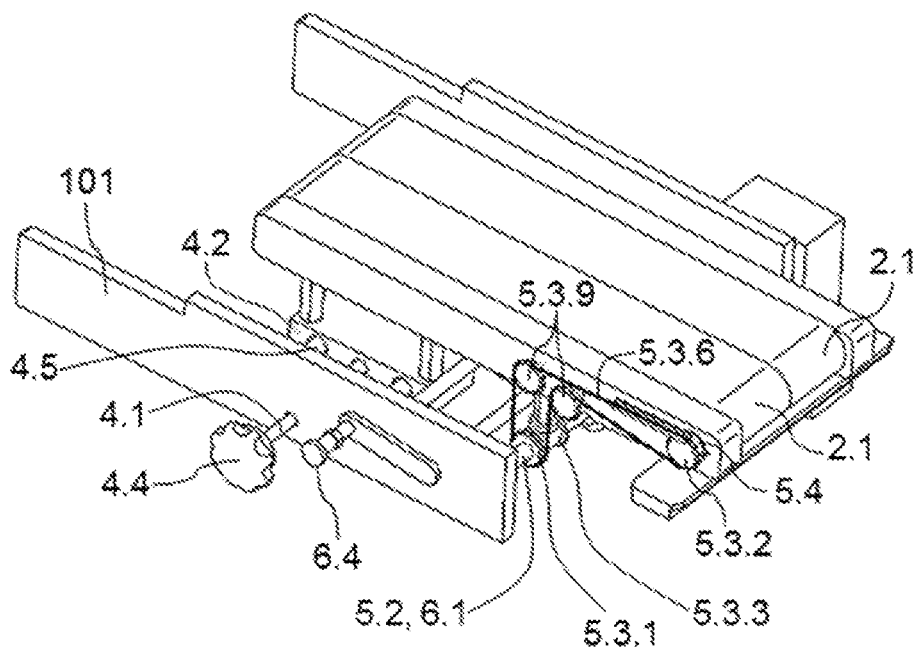
FIG. 5 shows perspective view of a separating system according to the embodiment of FIG. 2, with zero separation between the two support elements of the conveying means of the system.

In the embodiment of the system 100 shown in the drawings, each of the support elements 2.1 and 2.2 of the conveying means 2 comprises at least one conveyor belt, the three conveyor belts being operated by the same actuation means. The actuation means comprises a motor 5.1 coupled to a first rotating shaft 5.2 of the actuation means, the first rotating shaft 5.2 causing rotation of the conveyor belt of the additional support element 2.2, and the first rotating shaft 5.2 also causing rotation of a second rotating shaft 5.4 which causes rotation of the conveyor belts of the support elements 2.1 by means of an intermediate drive 5.3 transmitting rotation from the first rotating shaft 5.2 to the second rotating shaft 5.4. The intermediate drive 5.3 comprises a first crown wheel 5.3.1 associated with the first rotating shaft 5.2 and rotating integrally with the first rotating shaft 5.2, at least a second crown wheel 5.3.2 fixed to the second rotating shaft 5.4, and a transmission element 5.3.6 cooperating with both crown wheels 5.3.1 and 5.3.2 and linking them to one another. The transmission element 5.3.6 can be a belt, chain or equivalent element. At least two additional crown wheels 5.3.9 may be arranged between both crown wheels 5.3.1 and 5.3.2 as shown in FIG. 5, for example. In the embodiment of the drawings, the actuation means comprises two intermediate drives 5.3, one on each side of the conveying means 2, and the first rotating shaft 5.2 is also the pivoting element 6.1.

Figure 11:
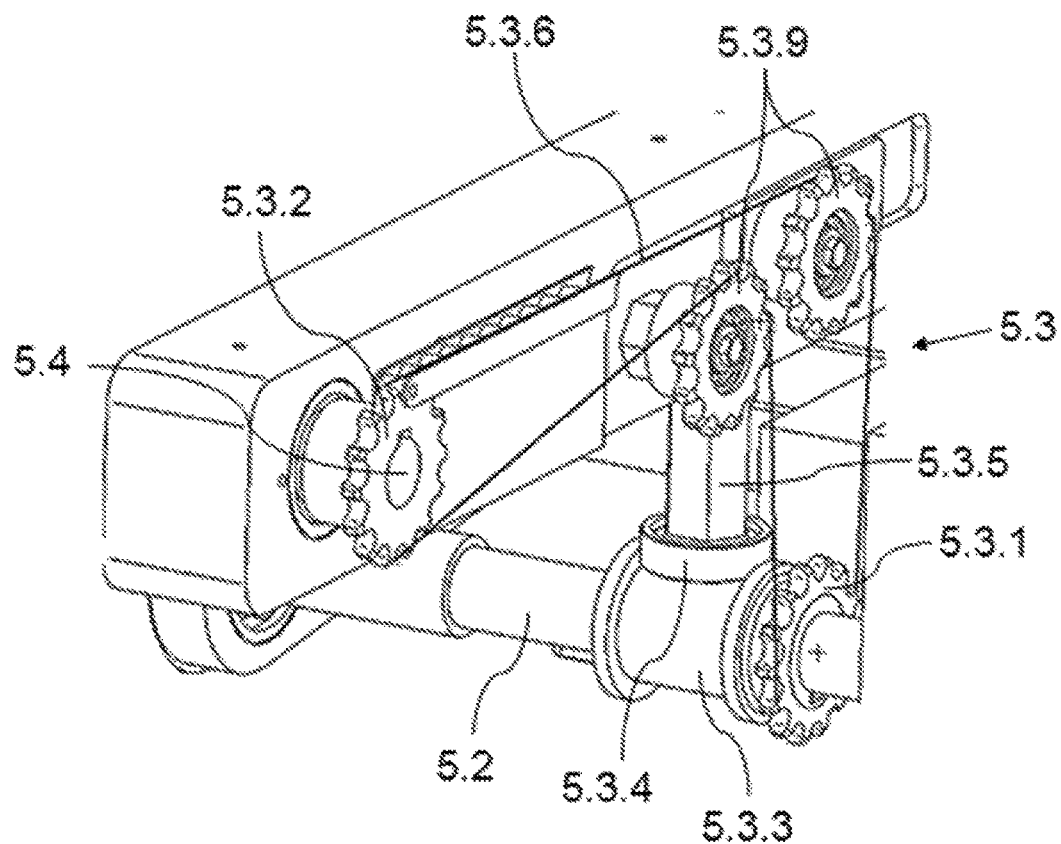
FIG. 11 shows a detail of an intermediate drive of the system of FIG. 2.

To transmit rotation of the first rotating shaft 5.2 to the conveyor belts of the support elements 2.1, the intermediate drive 5.3 further comprises a bushing 5.3.3 associated with each support element 2.1, shown in further detail in FIG. 11. Both bushings 5.3.3 are coupled to the first rotating shaft 5.2 with freedom of longitudinal movement with respect to the first rotating shaft 5.2, thereby rotating integrally with the first rotating shaft 5.2. The corresponding first crown wheel 5.3.1 is furthermore fixed to each bushing 5.3.3, such that the crown wheels 5.3.1 move and rotate integrally with the corresponding bushing 5.3.3. Each bushing 5.3.3 and its crown wheel 5.3.1 therefore form a transmission assembly that allows rotation of the conveyor belts independently of the separation between both support elements 2.1. Each bushing 5.3.3 is coupled to the first rotating shaft 5.2 such that can it can move along at least part of the first rotating shaft 5.2, and to that end the coupling is performed by means of a complementary connection, such as a cotter arranged in the bushing and its complementary groove in the first rotating shaft 5.2 (or vice versa).

To cause movement of a transmission assembly together with its support element 2.1, the transmission assembly is attached to the support element 2.1. The attachment is performed by means of a support 5.3.4 (a bearing for example) arranged on the bushing 5.3.3 and a fixing element 5.3.5 fixed to the support 5.3.4 and to the corresponding support element 2.1. The support 5.3.4 is arranged with respect to the bushing 5.3.3 such that it allows rotation of the bushing 5.3.3 and it moves integrally with it transversely. To that end, for example, the bushing can have two side walls between which the support 5.3.4 is arranged. Therefore, when the support elements 2.1 move for regulating the separation between both support elements 2.1, the bushings 5.3.3 also move, pushed by the support 5.3.4.

Figure 4:
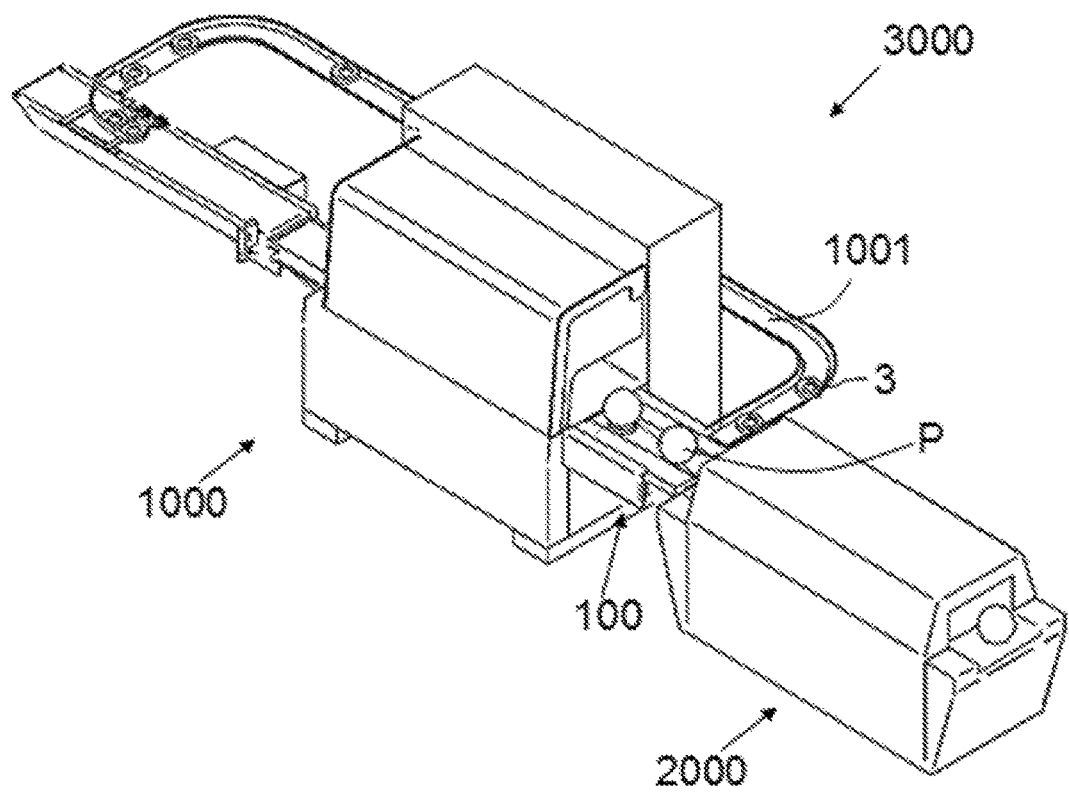
FIG. 4 is a perspective view of an embodiment of a packaging installation according to one embodiment, with a packaging machine and a separating system, where a shrink-wrap tunnel arranged after the separating system is furthermore shown.

Separating systems for separating products from their corresponding supports are widely used in packaging machines, for example, where in some cases the product is arranged on the corresponding support before being packaged. Therefore, another aspect relates to a packaging installation 3000 comprising a packaging machine 1000 and a separating system 100 according to the first aspect discussed above, although the separating system 100 could also be part of the packaging machine 1000. According to one embodiment, the separating system 100 is arranged after the packaging machine 1000, as shown in FIG. 4.

In packaging machines for packaging products with an unstable shape (products which, given their shape, require support during conveyance to holding them in position, such as heads of cabbage or lettuce, for example), each product P is arranged on a corresponding support 3, having a width less than a maximum width of the product P, for holding it in position during packaging and conveyance. Another aspect relates to a packaging machine 1000 of this type, comprising a separating system 100 according to the first aspect. In machines of this type, a film tube wrapping the products P to be packaged is formed from a film reel, and the machine comprises packaging means that seal and cut the film tube, generating individual packages with the product P inside them during conveyance by means of the first conveying means 1. The support 3 is arranged below the film, between the film and the first conveying means 1, and the products P are arranged above the supports 3, the shape of which prevents random movement of the products P during conveyance and packaging, and above the film arranged on the supports 3. With the support 3 and the product P arranged in this manner, tubular shape is given to the film, the product P thereby being wrapped, and the film tube is cut and sealed in the required points or areas, thereby obtaining an individual packaged product P. The product P is therefore already packaged when it reaches the conveying means 2 according to some embodiments.

The packaging machine 1000 can further comprise alignment means (not depicted in the drawings) so that the supports 3 (and the products P arranged on them) are fed into the separating system 100 substantially aligned with respect to the separation between the two support elements 2.1 of the conveying means 2 of the separating system 100, thereby assuring that the supports 3 pass through the space between the support elements 2.1 when they reach the conveying means 2, thereby assuring a correct separation between the products P and their supports 3.

In another embodiment, the packaging installation 3000 comprises tightness control systems for detecting defective packages, X-ray systems for detecting particles not apt for consumption inside the package, or other quality control systems arranged between the packaging machine 1000 and the separating system 100, connected to a control unit. The control unit is associated with the adjustment means of the separating system 100, and the adjustment means is adapted for regulating the separation between the support elements 2.1 automatically when a defective package is detected, such that the control unit causes the drive of the actuator, which generates rotation of the drive shaft 4.1, causing the increase in separation between the support elements 2.1 and generating a separation greater than the width of the product P with respect to the conveyance direction PT, and the defective package together with its corresponding support 3 are discharged by means of the additional support element 2.2 through the separating system 100.

What is claimed is:

1. A separating system for separating a support from a product arranged on the support, the support having a first width, the product having a second width that is greater than the first width, the separating system comprising:
    a conveyer configured to receive the product while the product is arranged on the support, the conveyer configured to convey the product in a first conveyance direction, the second width of the product and the first width of the support being orthogonal to the first conveyance direction, the conveyer including a first support element having a length and a second support element having a length, the first and second support elements being arranged side-by-side and separated, or configured to be separated, by a space having a width that is less than the second width of the product and greater than the first width of the support at a location along the length of the first and second support elements so that the product may be supported by and conveyed in the first conveyance direction by the first and second support elements, the width of the space separating the first and second support elements configured to cause a removal of the product from the support upon the product being received on the conveyer, the width of the space separating the first and second support elements also being configured to cause a placement of the entire support to a position below the first and second support elements after the product is received on the conveyer.

2. The separating system according to claim 1, wherein the first support element is moveable in relation to the second support element in a direction transverse to the first conveyance direction so that the width of the space between the first and second support elements at the location along the length of the first and second support elements may be varied.

3. The separating system according to claim 1, wherein each of the first and second support elements is moveable in relation to one another in a direction transverse to the first conveyance direction so that the width of the space between the first and second support elements at the location along the length of the first and second support elements may be varied.

4. The separating system according to claim 3, further comprising an actuator that is configured to cause a simultaneous transverse movement with respect to the first conveyance direction of both the first and second support elements in opposite directions for regulating the width of the space between the first and second support elements.

5. The separating system according to claim 4, wherein the actuator comprises a rotatable drive shaft with a first threaded section associated with the first support element and a second threaded section associated with the second support element, the first threaded section comprising a thread in a first direction, the second threaded section comprising a thread in a second direction opposite the first direction, such that when the rotatable drive shaft rotates the first and second support elements move simultaneously to regulate the width of the space between the first and second support elements.

6. The separating system according to claim 5, wherein the actuator comprises:
a first transmission element with a hole having a thread complementary to the thread of the first threaded section of the drive shaft, the first threaded section being threaded in the hole of the first transmission element; and
a second transmission element with a hole having a thread complementary to the thread of the second threaded section of the drive shaft, the first threaded section being threaded in the hole of the second transmission element.

7. The separating system according to claim 6, wherein the first support element is fixed to a structure that is fixed to the first transmission element and the second support element is fixed to a structure that is fixed to the second transmission element.

8. The separating system according to claim 5, wherein the actuator comprises a guide for guiding the movement of the first and second transmission elements.

9. The separating system according to claim 1, wherein the conveyer comprises a third support element located below the first and second support elements that is configured to receive the support when the product is separated from the support.

10. The separating system according to claim 9, wherein the third support element is configured to convey the support in a second conveyance direction that is different from the first conveyance direction.

11. The separating system according to claim 9, wherein the entirety of the third element resides below the first and second support elements.

12. The separating system according to claim 9, wherein the each of the first and second support elements has a first end and a second end, the first conveyance direction being in a direction from the first end to the second end, the third support element having a first part and a second part, the first part of the third support element being located nearer the first end of the first and second support elements than is the second part of the third support element, the first part of the third support element being located a first distance below a top surface the first and second support elements, the second part of the third support element being located a second distance below the top surface of first and second support elements, the first distance being less than the second distance.

13. The separating system according to claim 12, wherein the first part of the third support element is located in the space separating the first and second support elements.

14. The separating system according to claim 12, wherein each of the first part and second part of the third support element resides below the first and second support elements.

15. The separating system according to claim 10, wherein the second conveyance direction has an angle of inclination with respect to the first conveyance direction.

16. The separating system according to claim 15, wherein the angle of inclination of the second conveyance direction with respect to the first conveyance direction is variable between a first angle of inclination and a second angle of inclination.

17. The separating system according to claim 16, further comprising an actuator assembly coupled to the third support element, the actuator assembly configured to act on the third support element to change the first angle of inclination to the second angle of inclination.

18. The separating system according to claim 17, wherein the actuator assembly comprises a pivoting element and an actuation element associated with the third support element, the pivoting element and actuation element being spaced from one another in the second conveyance direction and coupled to one another by an attachment element, the pivoting element also being associated with a fixed structure of the separating system, a rotation of the actuation element with respect to the pivoting element causes a movement of the third support element to change the first angle of inclination to the second angle of inclination.

19. The separating system according to claim 9, wherein each of the first, second and third support elements respectively comprises a first, second and third conveyor belt.

20. The separating system according to claim 19 wherein all of the first, second and third conveyor belts are driven by the same drive means.

21. The separating system according to claim 20, wherein the drive means comprises a motor associated with a first rotating shaft that causes rotation of the conveyor belt of the third support element, with a second rotating shaft that causes rotation of the conveyor belt of the first and second support elements, the second rotating shaft being coupled with the first rotating shaft by an intermediate drive that causes the second rotating shaft to rotate in response to a rotation of the first rotating shaft.

22. The separating system according to claim 21, wherein the intermediate drive comprises a first crown wheel associated with the first rotating shaft, a second crown wheel fixed to the second rotating shaft, and a transmission element cooperating with and extending between both the first and second crown wheels.

23. The separating system according to claim 22, wherein the intermediate drive comprises a bushing associated with each of the first and second support element, the bushing being coupled to the first rotating shaft with freedom of longitudinal movement with respect to the first rotating shaft and which thereby rotates integrally with the first rotating shaft, a support arranged on the bushing and a fixing element fixed to the support and to the corresponding first and second support element, the first crown wheel being fixed to the bushing.

24. A packaging installation comprising:
a packaging machine; and
a separating system for separating a support from a product arranged on the support, support having a first width and the product having a second width, the second width of the product being greater than the first width of the support, the separating system comprising:
a conveyer configured to receive the product while the product is arranged on the support, the conveyer configured to convey the product in a first conveyance direction, the second width of the product and the first width of the support being orthogonal to the first conveyance direction, the conveyer including a first elongate support element having a length and a second elongate support element having a length, the first and second support elements being arranged side-by-side and separated, or configured to be separated, by a space having a width that is less than the second width of the product and greater than the first width of the support at a location along the length of the first and second elongate support elements so that the product may be supported by and conveyed in the first conveyance direction by the first and second support elements, the width of the space separating the first and second elongate support elements configured to cause a removal of the product from the support upon the product being received on the conveyer, the width of the space separating the first and second elongate support elements also being configured to cause a placement of the entire support to a position below the first and second elongate support elements after the product is received on the conveyer, the separating system located and configured to receive the product arranged on the support from the packaging machine.

* * * * *